US005928789A

United States Patent [19]

Chen et al.

[11] Patent Number: 5,928,789

[45] Date of Patent: Jul. 27, 1999

[54] INK JET PRINTING MEDIUM

[75] Inventors: Chih-Chiang Chen, Hsinchu; Jing-Pin Pan, Hsinchu Hsien; Shu-Chu Shih, Pader; Charng-Shing Lu, Tainan Hsien, all of Taiwan

[73] Assignee: Industrial Technology Research Institute, Hsinchu, Taiwan

[21] Appl. No.: 08/998,685

[22] Filed: Dec. 29, 1997

[51] Int. Cl.[6] .............................. B32B 27/38; B41M 5/00

[52] U.S. Cl. .......................... 428/413; 427/152; 428/195; 428/211; 428/212; 428/500; 428/520; 428/522

[58] Field of Search .................................... 428/195, 200, 428/207, 211, 212, 323, 331, 411.1, 421, 423.1, 478.2, 500, 522, 532, 413; 346/100; 427/152, 146

[56] References Cited

U.S. PATENT DOCUMENTS

| | | | |
|---|---|---|---|
| 4,379,804 | 4/1983 | Eisele et al. | 428/332 |
| 4,399,443 | 8/1983 | Yasufuku et al. | 346/1.1 |
| 5,314,713 | 5/1994 | Mori et al. | 427/152 |
| 5,455,868 | 10/1995 | Harasawa et al. | 428/206 |
| 5,478,631 | 12/1995 | Kawano et al. | 428/212 |
| 5,837,375 | 11/1998 | Brault et al. | 428/411.1 |

*Primary Examiner*—Bruce H. Hess
*Assistant Examiner*—Michael E. Grendzynski
*Attorney, Agent, or Firm*—W. Wayne Liauh

[57] ABSTRACT

An ink jet printing medium is disclosed. It contains (a) a substrate; (b) an ink absorption layer; and (c) a reinforcement layer sandwiched between said substrate and said ink absorption layer. The reinforcement layer, which is provided at a thickness about 5% to 100% of a thickness of said ink absorption layer, comprises: (a) a carboxylated acrylonitrile rubber at about 7 to 25 wt %; (b) an epoxy resin containing at least two epoxy groups, about 45 to 70 wt %; (c) a hardener containing at least two functional groups, provided at an equivalent ratio of between about 0.9 and 1.1 relative to said epoxy resin; and (d) a catalyst. The inkjet printing medium exhibits excellent adhesion between the ink absorption medium and the substrate, and improved water resistance without affecting printing quality.

16 Claims, 1 Drawing Sheet

INK JET PRINTING MEDIUM

FIELD OF THE INVENTION

The present invention relates to an improved ink jet printing or recording medium, which contains at least one ink absorbing layer on a substrate, for use with ink jet printing devices. More specifically, the present invention relates to an ink jet printing medium with improved adhesion between the ink absorbing layer and the substrate. The improved ink jet printing medium of the present invention is highly transparent; it also exhibits excellent ink jet print quality, reduced curl and improved water resistance.

BACKGROUND OF THE INVENTION

In recent years, inkjet printing devices, including inkjet printers, fax machines, copiers, etc., have seen a very rapid growth and, whether at home or in office, they have become an integral part of our everyday life. The basic ink jet printing process involves one or more electrically driven ink jet printing heads. Each printing head contains a tiny discharge orifice which typically ranges from 40 to 50 microns, but can be from 10–200 microns. Typically the printing heads are energized by a magnetostrictive or piezoelectric means to emit a modulated stream of ink droplets, which are printed onto the printing (or recording) medium to form a replica of the image being transmitted. Ink jet printers (including fax machines, copiers, etc.) have several distinct advantages over other printing mechanisms such as laser jet printers in that, among other things, they involve very clean operations (i.e., do not require toners which can cause a mess if leakage occurs), do not need warm-up time, can be made very compact in size, require less parts and with much simpler construction, and are much less expensive than the laser jet printers. Continuous improvements in ink jet printers have further increased their popularity as well as widening their range of applications.

The overwhelming majority of the inks used in office ink jet printers belong to the water-soluble dye-based inks, which provide more vivid color than the pigment-based inks, but with relatively poorer water and light resistance. The printing or recording media, on which the jet streamed inks are printed or recorded, can be regular paper, coated paper, glossy paper, transparency, or even fabrics. One of the key factors affecting the print quality is the absorbability of the ink droplets by the printing medium. In order to obtain high-quality prints, there must be an optimum coordination between the print medium and the ink droplets.

Because water-soluble dye-based inks are the prevalent choice in the office ink jet printers, smearing on regular paper or transparency has been the major concern troubling ink jet users. Most of ink jet printing papers contain an ink absorption layer on a substrate. Because different types of substrates, which can be various types of papers or transparencies, exhibit different degrees of transparency, smoothness, porosity, whiteness, etc. in order for different types of applications, it is very difficult, if not impossible, to find an ink absorption layer that will fit different types of substrates. As discussed above, in order to obtain high-quality prints, there must be an optimum match between the print medium, mainly the absorption layer, and the ink droplets. Different types of printing media also exhibit different degrees of surface smoothness, anisotropicity, curl, and water resistance, etc. All these factors must be considered in the selection of the optimum ink. Typically, because there exist only limited choices with regard to the ink jet absorption materials for a given substrate, different types of inks are required in order to obtain the best results on a given type of printing medium. This is an expensive undertaking and usually cannot be afforded by the general public.

U.S. Pat. No. 4,300,820 discloses an absorption composition capable of absorbing more than 45% of its weight of water without dissolution at room temperature to form an optically clear hydrogel. The absorption composition contains 40 to 98 weight percent of water-soluble polymer of a vinyl lactam and 2 to 60 weight percent of a water-insoluble copolymer.

U.S. Pat. No. 4,369,229 discloses a laminated polymeric product in which one layer of the product is a polymeric blend capable of absorbing a large amount of water to form a hydrogel without dissolution at room temperature and the other layer adherent to the first, is a tough plastic or polymeric composition which is substantially inert to or resistant to water.

One of the shortcomings with the printing media disclosed in the '820 and '229 patents is that it contains a blend of water-soluble and water-insoluble polymers, which can cause phase separation by aging, causing a haze in the coated layer and a loss in transparency.

U.S. Pat. No. 4,503,111 discloses a recording material for ink jet printers comprising a hydrophobic substrate material with a leave polymeric coating, which is a mixture of polyvinylpyrrolidone and a compatible matrix-forming polymer, which can be gelatin or polyvinyl alcohol swellable by water and insoluble at room temperature but soluble at elevated temperatures. The printing medium disclosed in the '111 patent exhibited relatively inadequate water resistance and can become tacky in high humidity environment.

U.S. Pat. No. 4,935,307 discloses a hydrophilic polymeric blend which comprises at least one water-absorbing, hydrophilic polymeric material, at least one hydrophobic polymeric material having acid functionality, and at least one polyethylene glycol. The polymer blend provided improved durability and reduced curl which used as an image-receptive layer on graphic arts films. However, because of the relatively poor incompatibility between the polymers, phase separations can be observed, adversely affecting transparency.

Because of the large inherent advantages of ink jet printers and their immense potential market, it is important to develop improved printing medium for ink jet printers which can provide increased adhesion between the absorption layer and the substrate, so as to allow more flexible selections of the optimum absorption layers with regard to the various types of substrates, without having to compromise on other qualities such as curl, transparency, and water resistance.

SUMMARY OF THE INVENTION

The primary object of the present invention is to develop an improved printing or recording medium for ink jet printing devices such as ink jet printers, fax machines, copiers (generally referred to as ink jet printers) with improved adhesion between the absorption layer the underlying substrate, which can be paper, transparency, fabrics, etc. More specifically, the primary object of the present invention is to develop an improved ink jet printing medium with improved adhesion between the absorption layer and the substrate, so as to eliminate many of the factors that have limited the selection of the optimum absorption layer for a target substrate and ensure desired print qualities, such as good water and light resistance, reduced curl, uniform surface and surface smoothness, to be obtained.

In the present invention, a reinforcement layer is provided which is sandwiched between the absorption layer and the substrate, so as to improve the adhesion between the absorption layer and the substrate and, consequently, allow a wider variety of ink absorption materials to be selected for a target substrate which will provide optimum performance. The reinforcement layer contains about 7 to 25 wt % of a carboxylated acrylonitrile rubber (CTBN), about 45 to 70 wt % of an epoxy resin which contains at least two epoxy groups, and the balance including a hardener containing at least two functional groups, and a catalyst. The ratio between the hardener and the epoxy resin, based on equivalents, should be between about 0.9 and 1.1.

Preferably, in the reinforcement composition of the present invention, the amount of acrylonitrile is about 19 to 41 wt % of the total carboxylated acrylonitrile rubber. The epoxy resin can be of the bisphenol A moiety, the Novolac moiety, aliphatic glycol moiety, epoxied butadiene, cpoxided glyceride, or reactive low viscosity epoxy resins. Examples of preferred epoxy resins include tetraglycidylmethylenedianiline, diglycidyl ortho-phthalate, diglycidyl ether of bisphenol A, glycidyl ether of novolac, epoxy cresol novolac, etc. A wide variety of hardening agents can be used in the present invention. The preferred hardening agents include methyl-tetrahydrophthalic anhydride (MTHPA)/ethylene glycol, ethylene diamine, diethylene triamine, m-phenylene diamine, trimellitic acid glycol, polymercaptan, etc. As discussed above, the ratio between the hardening agent and the epoxy resin should be between about 0.9 and 1.1, on equivalent basis. Preferably, the catalyst is 1-benzyl-2-methylimidazole (1 $B_2MZ$) or 1-cyanoethyl-2-ethyl-4-methylimidazole, in the amount of about 3 to 7 phr (parts per hundred parts resin). Preferably, the reinforcement composition is dissolved in methyl ethyl ketone (MEK) in a concentration of about 30 to 70 wt %, before being applied onto the substrate.

One of the advantages of the present invention is that a wide variety of ink droplet absorption compositions can be used in preparing the absorption layer. Preferably, the ink absorption composition comprises about 5 to 20 wt % of polyvinylpyrrolidone (PVP, with a weight-average molecular weight between about 8,000 and 212,600), about 5 to 20 wt % of polyvinyl alcohol (PVA, with a weight-average molecular weight of about 10,000 to 100,000), about 0.5 to 3.0 wt % of polyethylene glycol (PEG, with a weight-average molecular weight of about 200 to 2,000), about 3 to 15 wt % of salicylic acid (SA), about 0 to 5 wt % of poly(methyl methacrylate) (PMMA), and about 0.1 to 5 wt % of disodium ethylenediamine tetraacetate (EDTA $Na_2$ $H_2O$).

Optionally, depending on the type of absorption composition used, it may be desirable to add up to about 90 wt % of the absorption composition into the reinforcement layer. The absorption layer can also contain up to about 20 wt % of the reinforcement composition. In other words, the reinforcement layer can be a mixture of 0 to 90 wt % absorption composition and about 10 to 100 wt % reinforcement composition, and the absorption layer can be a mixture of 0 to 20 wt % reinforcement composition and about 80 to 100 wt % absorption composition. The ratio between the thicknesses of the absorption and reinforcement layers should preferably be between 1:1 to 20:1.

BRIEF DESCRIPTION OF THE DRAWING

The present invention will be described in detail with reference to the drawing showing the preferred embodiment of the present invention, wherein.

DETAILED DESCRIPTION OF THE PREFERRED EMBODIMENT

Figure 1:
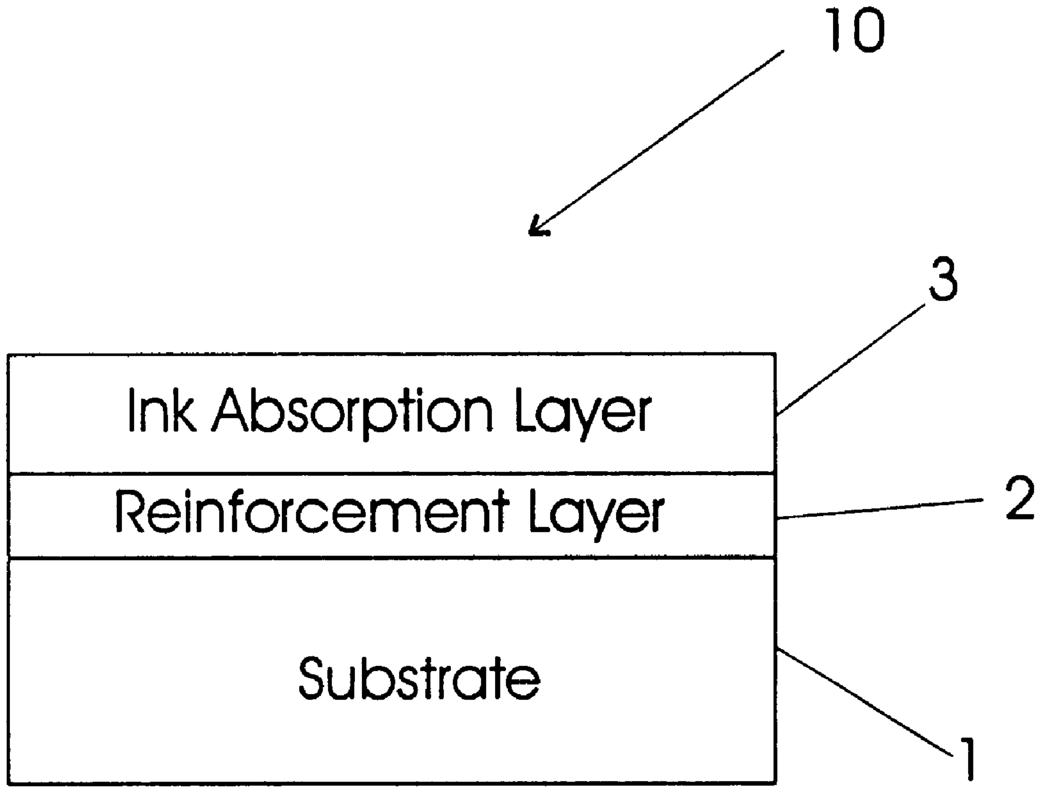
FIG. 1 is a schematic drawing showing the three-layer structure of the improved ink jet printing medium of the present invention.

The present invention discloses an improved printing or recording medium for ink jet printing devices such as ink jet printers, fax machines, copiers. As shown in FIG. 1, the improved ink jet printing medium 10 contains a three-layered structure with the reinforcement layer 2 sandwiched between the ink absorption layer 3 and the substrate 1 to provide improved adhesion between the absorption layer and the substrate. The design of the reinforcement layer eliminates many of the compatibility problems which would have limited the selection of an optimum absorption layer for a target substrate and ensures that desired print qualities, such as good water and light resistance, reduced curl, uniform surface and surface smoothness, be attained.

The reinforcement layer contains about 7 to 25 wt % of a carboxylated acrylonitrile rubber (CTBN), about 45 to 70 wt % of an epoxy resin which contains at least two epoxy groups, and the balance including a hardener containing at least two functional groups, and a catalyst. The ratio between the hardener and the epoxy resin, based on equivalents, should be between about 0.9 and 1.1. The reinforcement composition is first prepared by dissolving the ingredients in MEK at a concentration preferably between 30 and 70 wt %.

Optionally, depending on the type of absorption composition used, it may be desirable to add up to about 90 wt % of the absorption composition into the reinforcement layer. The absorption layer can also contain up to about 20 wt % of the reinforcement composition. In other words, the reinforcement layer can be a mixture containing 0 to 90 wt % absorption composition and about 10 to 100 wt % reinforcement composition, and the absorption layer can be a mixture of 0 to 20 wt % reinforcement composition and about 80 to 100 wt % absorption composition. The ratio between the thicknesses of the absorption and reinforcement layers should preferably be between 1:1 to 20:1.

Preferably, in the reinforcement composition of the present invention, the amount of acrylonitrile is about 19 to 41 wt % of the total carboxylated acrylonitrile rubber. A wide variety of epoxy resins can be used in the present invention. The epoxy resin can be of the bisphenol A moiety, the Novolac moiety, aliphatic glycol moiety, epoxized butadiene, cpoxided glyceride, or reactive low viscosity epoxy resins. Examples of preferred epoxy resins include tetraglycidylmethylenedianiline, diglycidyl ortho-phthalate, diglycidyl ether of bisphenol A, glycidyl ether of novolac, epoxy cresol novolac, etc. A wide variety of hardening agents also can be used in the present invention. The preferred hardening agents include methyl-tetrahydrophthalic anhydride (MTHPA)/ethylene glycol, ethylene diamine, diethylene triamine, m-phenylene diamine, trimellitic acid glycol, polymercaptan, etc. As discussed above, the ratio between the hardening agent and the epoxy resin should be between about 0.9 and 1.1, on equivalent basis. Preferably, the catalyst is 1-benzyl-2-methylimidazole (1 $B_2MZ$) or 1-cyanoethyl-2-ethyl-4-methylimidazole, in the amount of about 3 to 7 phr (parts per hundred parts resin). Preferably, the reinforcement composition is dissolved in methyl ethyl ketone (MEK) in a concentration of about 30 to 70 wt %, before being applied to the substrate.

A wide variety of ink droplet absorption compositions can be used in preparing the absorption layer. Preferably, the ink absorption composition comprises about 5 to 20 wt % of polyvinylpyrrolidone (PVP, with a weight-average molecular weight between about 8,000 and 212,600), about 5 to 20 wt % of polyvinyl alcohol (PVA, with a weight-average molecular weight of about 10,000 to 100,000), about 0.5 to 3.0 wt % of polyethylene glycol (PEG, with a weight-average molecular weight of about 200 to 2,000), about 3 to 15 wt % of salicylic acid (SA), about 0 to 5 wt % of poly(methyl methacrylate) (PMMA), and about 0.1 to 5 wt % of disodium ethylenediamine tetraacetate (EDTA $Na_2$ $H_2O$). This composition was generally referred to as the HP absorption layer composition.

In forming the printing medium, the substrate can be paper, transparency, or fabrics, it typically has a thickness of about 100 μm. Preferably the reinforcement layer has a thickness of about 1 to 15 μm and is applied on the substrate and dried by heating at 80° C. for 1 to 5 minutes, 100° C. for 1 to 5 minutes, 120° C. for 1 to 5 minutes. The ink absorption layer preferably has a thickness of about 5 to 25 μm, and is applied onto the reinforcement layer and dried by heating at a temperature of 140° C. for 2 to 5 minutes.

The present invention will now be described more specifically with reference to the following examples. It is to be noted that the following descriptions of examples, including the preferred embodiment of this invention, are presented herein for purposes of illustration and description, and are not intended to be exhaustive or to limit the invention to the precise form disclosed.

EXAMPLE 1

A reinforcement layer composition was prepared by mixing 2,620 g of an epoxy resin (epoxy equivalents about 185 to 195), 620 g of methyl-tetrahydrophthalic anhydride (MTHPA), 2,750 g of MEK (containing 20 wt % of CTBN), and 660 g of 1-benzyl-2-methylimidazole (1 $B_2Mz$). After stirring for 1 hour, the mixture was coated on a substrate and heated at 80° C. for 1 minute, 100° C. for 1 minute, and 120° C. for 2 minutes. The coating thickness was 2 μm.

An ink absorption layer composition was prepared by mixing 201.5 g of PVP (Mw=63,000), 555.9 g of EtOH and 556.6 g of water. The mixture was stirred after PVP was completely dissolved. 43 g of salicylic acid was dissolved in 200 go of EtOH. The salicylic acid and PVP solutions were mixed together to form solution (a). 273.7 g of PVP was added into 169 g of EtOH and 2,801.1 g of water and stirred at room temperature until completely dispersed, then heated at 60° C. while stirring until the PVP was completely dissolved to form solution (b), which was subsequently cooled to room temperature. Solution (a), 5.5 g of polyethylene glycol, and 5.5 g of PMMA were added to 170 g of EtOH and stirred until complete dispersion, to form solution (c). Solutions (b) and (c) were mixed together. Finally, 1.96 g of EDTA in 20 g water were added to the mixed solution to form the absorption layer composition. The absorption layer composition was coated onto the reinforcement layer and heated at 140° C. for three minutes to form an absorption layer having a thickness of 20 μm.

The printing media prepared above were tested for various printing performances including water resistance, print quality and the adhesion between the absorption layer and the substrate. The adhesion test was conducted using a 31B NITTOTAPE to form a cross-shaped scratch having a length of about 1.0 to 1.5 cm. The scratch was pressed upon with a rubber eraser for 90 seconds and then the eraser was vertically pulled up. Examination of any loss of adhesion was conducted at three locations. If the coating layer was peeled off in all three locations, a mark "X" was checked. If the coating layer was peeled off in only one or two locations, a mark "Δ" was checked. A circle "○" was checked if no peeling off was observed in any of the locations.

Print quality was conducted using an HP ink jet printer and the test result was observed visually to see if there was any defect. A circle "○" was checked if no obvious defects were observed. Water resistance test was conducted by immersing the printing medium into water that had been subject to reverse osmosis for 5 minutes, drying the printing medium at 100° C. for 10 minutes, then testing its adhesion. Water resistance tests were conducted on printing medium whose substrate was a transparency. The test results are summarized in Table 1.

EXAMPLE 2

The ink absorption layer composition and the reinforcement layer composition in Example 2 were identical to those in Example 1. However, the reinforcement layer contained a mixture of 100 parts by weight of the reinforcement layer composition and 20 parts by weight of the absorption layer composition, and was heated at 140° C. for 3 minutes to attain a final thickness of 10 μm. The absorption layer containing 100% of the absorption layer composition as prepared in Example 1 was applied onto the reinforcement layer and heated at 140° C. for 3 minutes to attain a final thickness of 10 μm. The printing media so prepared were tested for their water resistance, print quality and the adhesion between the absorption layer and the substrate in a procedure similar to Example 1. The test results are summarized in Table 1.

EXAMPLE 3

The ink absorption layer composition and the reinforcement layer composition in Example 3 were identical to those in Example 1. However, the ink absorption layer contained a mixture of 20 parts by weight of the reinforcement layer composition and 500 parts by weight of the absorption layer composition, was coated on a reinforcement layer of 2 μm thick and was heated at 140° C. for 3 minutes to attain a final thickness of 20 μm. The reinforcement layer containing 100% of the reinforcement layer composition as prepared in Example 1 was applied onto the substrate prior to the application of the ink absorption layer. The printing media so prepared were tested for their water resistance, print quality and the adhesion between the absorption layer and the substrate in a procedure similar to Example 1 and the test results are summarized in Table 1.

COMPARATIVE EXAMPLE 1

The procedure in preparing the printing media in Comparative Example 1 was identical to that in Example 1, except that it did not contain the reinforcement layer. The printing media so prepared were tested for their water resistance, print quality and the adhesion between the absorption layer and the substrate in a procedure similar to Example 1 and the test results are summarized in Table 1.

TABLE 1

| | Adhesion | Water resistance | Printing Quality |
|---|---|---|---|
| Example 1 | ○ | ○ | ○ |
| Example 2 | ○ | ○ | ○ |
| Example 3 | ○ | ○ | ○ |
| Comp. Ex. 1 | X | X | ○ |

Table 1 indicates the superior quality of the ink jet printing media of the present invention, with respect to adhesion between the absorption layer and the substrate, and water resistance.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. An ink jet printing medium comprising:

(a) a substrate;

(b) an ink absorption layer comprising an ink absorption composition; and (c) a reinforcement layer which is a reaction product of a reinforcement composition and is sandwiched between said substrate and said ink absorption layer to impart adhesion therebetween:

d) wherein said reinforcement composition which reacts to form said reinforcement layer comprises:

(i) a carboxylated acrylonitrile rubber at about 7 to 25 wt %;

(ii) an epoxy resin containing at least two epoxy groups, about 45 to 70 wt %;

(iii) a hardener containing at least two functional groups, provided at an equivalent ratio of between about 0.9 and 1.1 relative to said epoxy resin; and (iv) a catalyst.

2. The ink jet printing medium according to claim 1 wherein said reinforcement layer is provided at a thickness about 5% to 100% of a thickness of said ink absorption layer.

3. The ink jet printing medium according to claim 1 wherein said ink absorption composition is prepared from an aqueous ethylene alcohol solution which comprises:

(a) about 5 to 20 wt % of polyvinylpyrrolidone;

(b) about 5 to 20 wt % of polyvinyl alcohol;

(c) about 0.5 to 3.0 wt % of polyethylene glycol;

(d) about 3 to 15 wt % of salicylic acid;

(e) about 0 to 5 wt % of poly(methyl methacrylate);

(f) about 0.1 to 5 wt % of disodium ethylenediamine tetraacetate;

(g) about 15 to 30 wt % ethylene alcohol; and (h) about 50 to 70 wt % water.

4. The ink jet printing medium according to claim 1 wherein said ink absorption layer comprises:

(a) 0 to 20 wt % of said reinforcement composition; and (b) 80 to 100 wt % of said absorption composition.

5. The ink jet printing medium according to claim 1 wherein said reinforcement layer comprises:

(a) 0 to 90 wt % of said absorption composition; and (b) 10 to 100 wt % of said reinforcement composition.

6. The ink jet printing medium according to claim 1 wherein said substrate is paper, plastic transparency sheet, or fabric.

7. The ink jet printing medium according to claim 1 wherein said carboxylated acrylonitrile rubber contains about 19 to 41 wt % of acrylonitrile.

8. A multi-layer surface coating applied on an in ink jet printing substrate comprising:

(a) an ink absorption layer formed on a substrate and comprising an ink absorption composition; and (b) a reinforcement layer which is a reaction product from a reinforcement composition and is sandwiched between the substrate and said ink absorption layer to impart adhesion therebetween:

(c) wherein said reinforcement composition which reacts to form said reinforcement layer comprises:

(i) a carboxylated acrylonitrile rubber at about 7 to 25 wt %;

(ii) an epoxy resin containing at least two epoxy groups, about 45 to 70 wt %;

(iii) a hardener containing at least two functional groups, provided at an equivalent ratio of between about 0.9 and 1.1 relative to said epoxy resin; and (iv) a catalyst.

9. The multi-layer surface coating according to claim 8 wherein said reinforcement layer is provided at a thickness about 5% to 100% of a thickness of said ink absorption layer.

10. The multi-layer surface coating according to claim 8 wherein said ink absorption composition is prepared from an aqueous ethylene alcohol solution which comprises:

(a) about 5 to 20 wt % of polyvinylpyrrolidone;

(b) about 5 to 20 wt % of polyvinyl alcohol;

(c) about 0.5 to 3.0 wt % of polyethylene glycol;

(d) about 3 to 15 wt % of salicylic acid;

(e) about 0 to 5 wt % of poly(methyl methacrylate);

(f) about 0.1 to 5 wt % of disodium ethylenediamine tetraacetate;

(g) about 15 to 30 wt % ethylene alcohol; and (h) about 50 to 70 wt % water.

11. The multi-layer surface coating according to claim 8 wherein said ink absorption layer comprises 0 to 20 wt % of said reinforcement composition and 80 to 100 wt % of said absorption composition.

12. The multi-layer surface coating according to claim 8 wherein said reinforcement layer comprises 0 to 90 wt % of said absorption composition and 10 to 100 wt % of said reinforcement composition.

13. The multi-layer surface coating according to claim 8 wherein said carboxylated acrylonitrile rubber contains about 19 to 41 wt % of acrylonitrile.

14. A method for preparing an ink jet printing medium comprising the steps of:

(a) forming a reinforcement layer of about 1 to 15 $\mu$m on a substrate by coating a reinforcement composition on said substrate and causing said reinforcement composition to react;

(b) forming an ink jet absorption layer of about 5 to 25 $\mu$m on said reinforcement layer;

(c) wherein said reinforcement composition comprises the following components dispersed in an organic solvent:

(i) a carboxylated acrylonitrile rubber at about 7 to 25 wt %;

(ii) an epoxy resin containing at least two epoxy groups, about 45 to 70 wt %;

(iii) a hardener containing at least two functional groups, provided at an equivalent ratio of between about 0.9 and 1.1 relative to said epoxy resin; and (iv) a catalyst.

15. The method for preparing ink jet printing medium according to claim 14 wherein said reinforcement composition is dispersed in methyl ethyl ketone at a concentration between 30 and 70 wt %.

16. The method for preparing ink jet printing medium according to claim 14 wherein said ink jet absorption layer is formed by applying an ink jet absorption solution on said reinforcement layer which comprises:

(a) about 5 to 20 wt % of polyvinylpyrrolidone;

(b) about 5 to 20 wt % of polyvinyl alcohol;

(c) about 0.5 to 3.0 wt % of polyethylene glycol;

(d) about 3 to 15 wt % of salicylic acid (SA);

(e) about 0 to 5 wt % of poly(methyl methacrylate);

(f) about 0.1 to 5 wt % of disodium ethylenediamine tetraacetate;

(g) about 15 to 30 wt % ethylene alcohol; and (h) about 50 to 70 wt % water.

* * * * *